United States Patent [19]

Van Der Veer

[11] Patent Number: 4,653,281

[45] Date of Patent: Mar. 31, 1987

[54] DRINK MAKING METHOD AND APPARATUS

[76] Inventor: Richard F. Van Der Veer, 4521 Pawnee Trail, Sarasota, Fla. 33582

[21] Appl. No.: 757,088

[22] Filed: Jul. 19, 1985

[51] Int. Cl.⁴ ............................................. A23G 9/00
[52] U.S. Cl. ........................................... 62/71; 62/136; 62/342; 99/484; 366/144
[58] Field of Search ........................... 62/342, 136, 71; 99/484; 366/144

[56] References Cited

U.S. PATENT DOCUMENTS

| | | | |
|---|---|---|---|
| 1,442,945 | 1/1923 | Hauk | 62/342 X |
| 2,775,877 | 1/1957 | Bruntgen | 366/144 X |
| 3,276,633 | 10/1966 | Rahauser | 62/342 X |
| 3,279,205 | 10/1966 | Stoelting | 62/342 X |
| 3,335,911 | 8/1967 | Stutz | 366/156 X |
| 4,201,558 | 5/1980 | Schwitters et al. | 62/342 X |
| 4,275,567 | 6/1981 | Schwitters | 62/68 |
| 4,528,824 | 7/1985 | Herbert | 62/342 X |
| 4,551,025 | 11/1985 | Awes et al. | 62/342 X |

Primary Examiner—William E. Wayner

[57] ABSTRACT

Apparatus for making drinks comprising an ice-slush machine, a blender and an associated control assembly is disclosed. The ice-slush machine includes a reservoir, two associated chilling chambers with screw pumps, and a nozzle for dispensing ice-slush to the blender for being mixed with liquor and additional flavoring constituents. The control assembly effects a sequence of operations including the activation of the blender, followed by the initiation of the dispensing of the ice-slush, followed by the termination of the dispensing of the ice-slush, folllowed by the inactivation of the blender in order to make optimum and consistent drinks. Also disclosed is the method of making such drinks.

16 Claims, 13 Drawing Figures

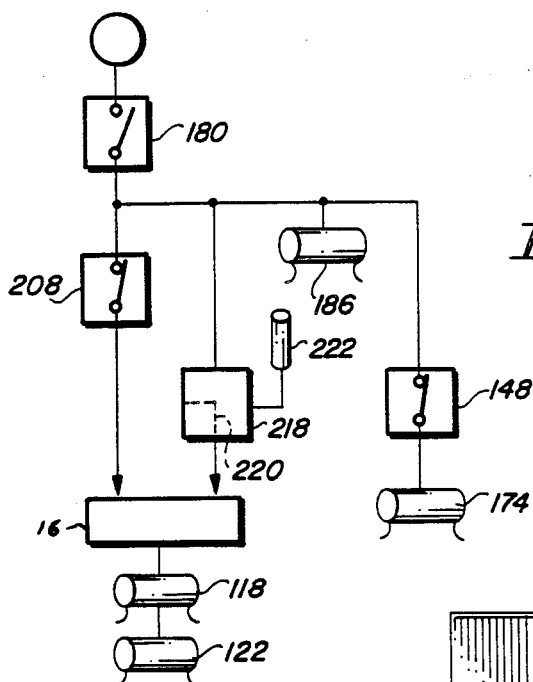
FIG._6
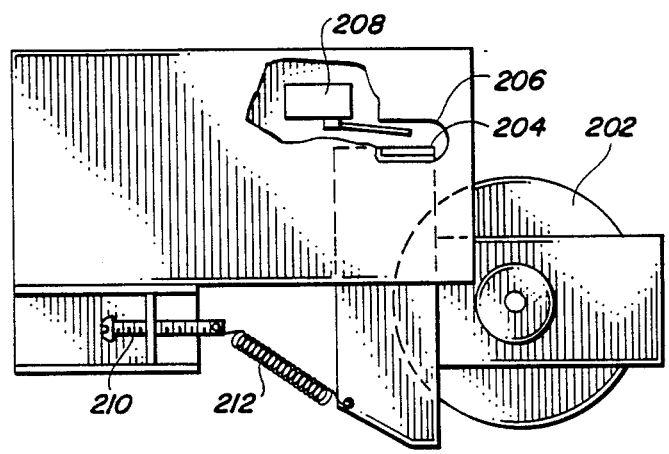
FIG._5C
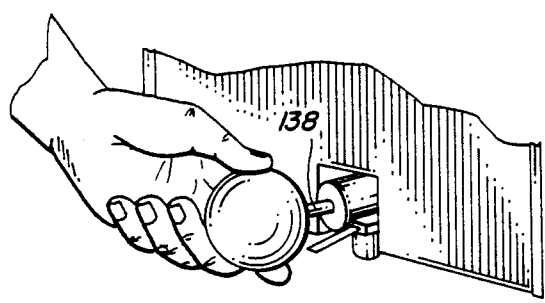
FIG._7
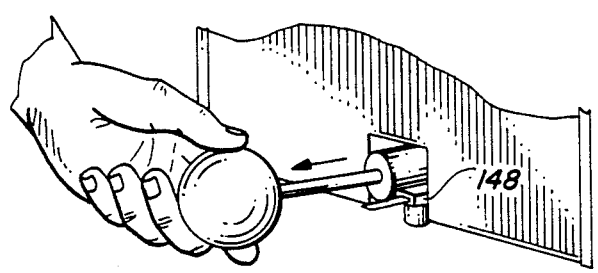
FIG._8
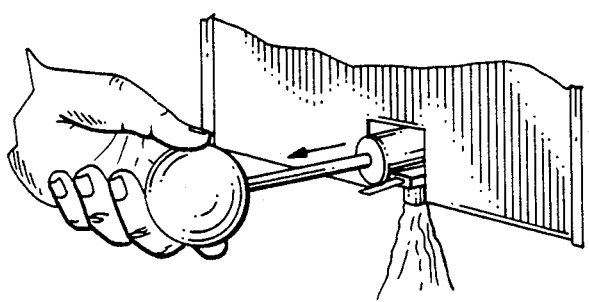
FIG._9
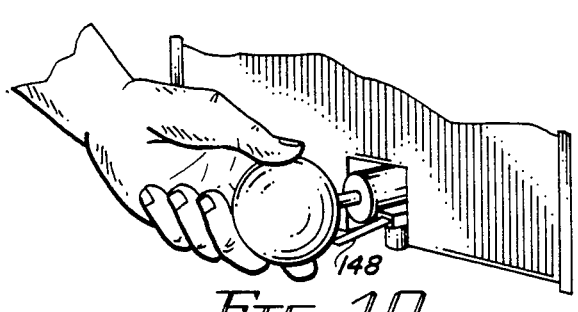
FIG._10

DRINK MAKING METHOD AND APPARATUS

BACKGROUND OF THE INVENTION

1. Field of the Invention

This invention relates to drink making and, more specifically, to an improved method and apparatus for making drinks with ice-slush and additional flavoring constituents through a specific sequence of dispensing and mixing of the constituents of the drink.

2. Description of the Prior Art

Various types of apparatus and methods have been utilized in the past for dispensing mixing the various constituents of frozen drinks formed from an ice-slush base.

A common technique for making frozen drink such as a frozen daiquiri would be to put into a blender an appropriate amount of liquor for flavoring and potency in combination with the fruit flavoring for the daiquiri, whether lime, strawberry, banana, or the like. Also added to thse constituents would be the base material of crushed ice formed of frozen water. The blending together of these constituent materials would create the daiquiri. Unfortunately, however, problems can occur resulting in inconsistency of taste of one drink mixture with respect to the next. Such inconsistency may result as a function of the amount of time the drink is blended. This is because the blending draws oxygen into the mixture, and excess oxygen can detract from the intended flavoring of the drink. Additionally, excess blending can induce heat energy into the drink, melt the ice cubes, and thus water down the drink reducing its preferred flavoring and minimizing the alcohol content per unit volume. The problem of minimized alcohol per unit volume can also occur to a properly mixed drink when it is allowed to sit at room temperature. The ambient environment will permit the ice cubes to melt which adds water to the drink and thus reduces both the flavor and alcoholic potency of the drink. On the other hand, a drink mixed insufficiently will render such drink of different flavor, consistency, and alcoholic potency from the top of the container to the bottom, from the first sip to the drink to the last.

A wide variety of systems, machines, devices, and apparatus have been developed and utilized in the past in an effort to render drink mixing a precise art. In U.S. Pat. No. 3,837,587 to Walter, for example, a drink mixing device is disclosed which concurrently crushes ice cubes formed from water, dispenses the crushed ice into a container, and mixes the crushed ice with other drink constituents in the container. In using such a device, the ice crusher and the impeller of the drink mixer are initiated concurrently and terminated concurrently. As a result, the mixing is terminated while the final portion of crushed ice is being dispensed into the container whereby incomplete mixing must always result. Further, the Walter device requires the adding of performed ice cubes to the machine before using the machine. This is less convenient than the utilization of an ice-slush machine for the basic constituent of the drink. Most significantly, however, the Walter device utilizes ice cubes formed from water. As a result, the crushed ice in the drink will melt through time to thus decrease the flavor and alcoholic potency of the drink over the period of consumption as compared to the time the drink was first made.

Another type of drink machine is disclosed in U.S. Pat. No. 3,086,563 to Patten. According to the Patten disclosure, a frozen milkshake fluid is dispensed into a container through a valve while a rotatable impeller or dasher mixes the dispensed fluid. The container is utilized by the operator as an implement to dispense the fluid through a predetermined vertical lifting motion. This motion can be effected independent of the rotation of the impeller. Similarly, the rotation of the impeller may be initiated and terminated by the horizontal motion of a container into and out of contact with a switch arm independent of the above described dispensing. Because of the requirement for two control mechanisms, each independently controlled by an operator, the over-mixing or under-mixing of the dispensed material may readily occur and the consistency of drinks thus remains a problem.

Another drink mixing machine is described in U.S. Pat. No. 2,775,877 to Bruntjen. According to that disclosure, a creamy milkshake-like base fluid is retained in a chilled upper reservoir and gravity dropped through a valve into a chilled mixing chamber. The mixed beverage is then dropped by the force of gravity into a further container which is removable with respect to the machine. Chilling chambers are thus utilized in two different segments of the machine. Further, the handle which opens the valve to dispense the base material also functions to simultaneously initiate and terminate the mixing. As a result, dispensing and mixing are always done concurrently causing less than optimumly mixed drinks as discussed in the paragraph above.

U.S. Pat No. 4,275,567 to Schwitters describes an ice-slush dispensing machine with a heat exchanger assembly. The heat exchanger assembly is activated and inactivated through sensors which determine the viscosity of the ice-slush to be dispensed. The refrigeration mechanism may also be activated when the dispensing valve is open. Such a system increases the efficiency of an ice-sluch dispenser. The ice-slush, however, is not adequately maintained at the optimum temperature and consistency. This is due to the fact the supplemental chilling is initiated only when the dispensing valve is opened, an event which is random in its occurrence.

A beverage blending machine of the coin-operated, soft drink variety is described in U.S. Pat. No. 3,335,911 to Stutz. That disclosure describes a machine that includes an auger for dispensing dry powder material which is mixed with water by a nozzle and then jointly dispensed into a blender. The blended fluid is then gravity dispensed through the bottom of the blending container to a supplemental container. The entire system as described in Stutz is controlled by a single timer. Such a machine is not designed for use in making ice-slush drinks.

Three additional patents are also of interest. These are U.S. Pat. No. 3,311,353 to Rogenski; U.S. Pat. No. 4,351,612 to Valbona; and U.S. Pat. No. 2,920,875 to Marfuggi. All three of these patents disclose drink mixing machines independent of dispensing apparatus. According to the Rogenski disclosure, as well as the Valbona disclosure, a container with the constituents to be mixed is moved to a location whereby a rotatable auger or impeller is immersed in the contents of the container. The container is then moved into contact with a switch to rotate the impeller and thus mix the drink. Movement of the container away from the switch stops the rotation of the auger. This puts the degree of mixing totally within the discretion of the operator. The Marfuggi blender is similar to that disclosed in Rogenski and Valbona except that the control of the impeller and the timing of the mixing is effected by a switch on the side of the machine which is manually controlled by an operator.

A typical ice-slush dispenser is disclosed in U.S. Pat. No. 3,319,436 to Wilch and in Wilch literature. These discloses, as understood, describe ice-slush machines including a heat exchanger for converting a sugar-based fluid into ice-slush. They also include one or two screw pumps for whipping the ice-slush and for conveying it to an operator controlled nozzle. It is the intention of the Wilch disclosures that the dispensed ice-slush be combined in a container of a blender with additional flavoring components such as liquor and daiquiri mix and that such combination of ingredients be mixed or blended off line in the blender. The blending, however, would be for a time as determined by an operator independent of the dispensing.

Lastly, additional apparatus is disclosed in literature to Taylor and Island Oasis. According to the Taylor disclosure, as understood, a machine is described similar to the Wilch ice-slush machine. The Taylor machine, however, is designed for dispensing an ice cream type mixture for subsequent mixing. As understood, the Island Oasis device employs a Taylor type machine in combination with a blender whereby the blender will receive the dispensed material from the Taylor machine. The blender will be activated and inactivated upon the initiation and termination of the dispensing of the ice cream type material. As a result, the final portion of dispensed material will not be blended since the impeller will cease upon the termination of the dispensing. A second switch is required if it is desired to operate the blender independent of the dispenser.

As illustrated by the great number of prior patents and other disclosures, efforts are continuously being made in an attempt to make drinks conveniently and consistently. None of these disclosures suggests the present inventive combination of elements for dispensing ice-slush and additional flavoring ingredients as herein described and claimed. These prior disclosures do not provide for the superior, consistent and convenient drinks time after time as occurs with the method and apparatus of the present invention. The present invention achieves it purposes, objectives and advantages over the prior art through new, useful and unobvious apparatus and method steps which consistently and conveniently insure high quality drinks through the use of a minimum number of functioning parts, at a reduction in cost, and through the utilization of only readily available materials and conventional components.

These objects and advantages should be construed as merely illustrative of some of the more prominent features and applications of the present invention. Many other beneficial results can be attained by applying the disclosed invention in a different manner or by modifying the invention within the scope of the disclosure. Accordingly, other objects and advantages as well as a fuller understanding of the invention may be had by referring to the summary of the invention and detailed description describing the preferred embodiment of the invention in addition to the scope of the invention as defined by the claims taken in conjunction with the accompanying drawings.

SUMMARY OF THE INVENTION

The present invention is defined by the appended claims with the specific preferred embodiment shown in the attached drawings. For the purposes of summarizing the invention, the invention may be incorporated into apparatus for making a drink comprising dispensed ice-slush and blended additional flavoring constituents. The apparatus includes an ice-slush machine formed with a reservoir for the receipt of a fluid, a chilling chamber in communication with the reservoir for converting fluid into ice-slush, a nozzle for selectively dispensing ice-slush from the machine, and transport means in communication with the chilling chamber and the nozzle to transport ice-slush from the chilling chamber to the nozzle. The apparatus also includes a container positionable beneath the nozzle for the receipt of ice-slush dispensed from the machine with the container having an open top end for the receipt of dispensed ice-slush and flavoring constituents to be blended therewith. The apparatus also includes a rotatable impeller for mixing the contents of the container and a single, operator activated control means to first initiate the rotation of the impeller, to then open the nozzle for initiating the dispensing of ice-slush, to then close the nozzle for terminating the dispensing of ice-slush while the impellar is rotating, and to then terminate the rotation of the impeller. The control means includes a movable handle and a switch in operative proximity with the handle. The control means includes a switch and a handle movable from a first position, at which the switch is held in an open state to maintain the impeller inactive, to another position, at which the switch is held in a closed state to maintain the impeller operative. The control means includes a switch and a handle movable from a first or rest position in contact with the switch which is in an open state and at which time the nozzle is closed, to a second or intermediate position out of contact with the switch which is in a closed state and at which time the nozzle is closed, to a third or open position out of contact with the switch which is in a closed state and at which time the nozzle is opened, to the second or intermediate position out of contact with the switch which is in a closed state and at which time the nozzle is closed, and to the first or rest position in contact with the switch which is in an open state and at which time the nozzle is closed.

The invention may also be incorporated into apparatus for making a drink comprising dispensed ice-slush and at least one additional constituent. Such apparatus includes an ice-slush machine formed with a reservoir for the receipt of a fluid, a chilling chamber in communication with the reservoir for converting fluid into ice-slush, a heat exchanger coil and associated compressor adjacent the chilling chamber, a nozzle for selectively dispensing ice-slush from the machine, and transport means in communication with the chilling chamber and the nozzle to transport ice-slush from the chilling chamber to the nozzle. The apparatus also includes a container positionable beneath the nozzle for the receipt of ice-slush dispensed from the machine, the container having an open top end for the receipt of dispensed ice-slush and at least one additional constituent to be blended therewith, the container having associated therewith a rotatable impeller for blending the contents of the container. The apparatus also includes a control means to initiate and terminate the rotation of the impeller and to open and close the nozzle for initiating and terminating the dispensing of ice-slush, all in a predetermined cycle of operation. The apparatus also includes a control means functioning to sense the temperature of the ice slush within the chilling chamber at predetermined time intervals to inactivate the compressor whenever the compressor is inactive and whenever the temperature within the chilling chamber is increased to above a predetermined optimum value, the control means also being adapted to sense the viscosity of the ice slush within the chilling chamber and to inactivate the compressor whenever the viscosity of the ice slush within the chilling chamber is increased to higher than the predetermined optimum value.

The invention may further be incorporated into apparatus for making a drink comprising blended flavoring and dispensed ice-slush. The apparatus includes an ice-slush machine formed with a reservoir; neutral base formed of water, sugar and egg white, two cylindrical chilling chambers with vertically spaced parallel axes in communication with the reservoir, a heat exchanger in association with the chilling chambers for converting the neutral base within the chilling chambers into ice-slush, a nozzle for selectively dispensing ice-slush from the machine, and two screw pumps rotatable about vertically spaced, parallel axes within the chilling chambers to whip and transport ice-slush from the chilling chambers to the nozzle. The apparatus further includes a container positionable beneath the nozzle for the receipt of ice-slush dispensed from the machine, the container having an open top end for the receipt of dispensed ice-slush and flavoring to be blended therewith, the container having mounted in operative association therewith a rotatable impeller for blending the contents of the container. The apparatus further includes control means to initiate and terminate the rotating of the impeller and to open and close the nozzle for initiation and terminating the dispensing of ice-slush, all in a predetermined cycle of operation. The apparatus further includes means to maintain the ice slush within the chilling chambers at a predetermined temperature and viscosity. The chilling chamber includes a heat exchanger coil encompassing both the screw pumps and a compressor operatively coupled with the coil. The chilling chamber is maintained at between about 22.8 and 25.2 degrees Fahrenheit, and the nozzle dispenses the ice-slush through an aperture of between about 0.9 and 1.1 inches. The neutral base includes between about 11 and 13 percent sugar by volume and about 2 and 4 percent egg white by volume and the nozzle dispenses the ice-slush through an aperture of between about 0.9 and 1.1 inches in diameter. The normal drink requires about 7 to 8 fluid ounces of ice-slush and the chilling chambers each contain about 3 quarts of ice-slush.

The invention may also be incorporated into a method of making a drink comprising dispensed ice-slush and blended flavoring. The method includes the steps of providing an ice-slush machine formed with a reservoir for the receipt of a fluid, a chilling chamber in communication with the reservoir for converting fluid into ice-slush, a nozzle for selectively dispensing ice-slush from the machine, and a transport means in communication with the chilling chamber and the nozzle to transport ice-slush from the chilling chamber to the nozzle. The method also includes the step of positioning a container beneath the nozzle for the receipt of ice-slush dispensed from the machine, the container having an open top end for the receipt of dispensed ice-slush and flavoring to be blended therewith and the container having mounted in association therewith a rotatable impeller for blending the contents of the container. The method also includes the step of performing an operator controlled cycle of operation to first initiate the rotation of the impeller, to then open the nozzle for initiating the dispensing of ice-slush, to then close the nozzle for terminating the dispensing of ice-slush, and to then terminate the rotation of the impeller. The performing of an operator controlled cycle of operation to initiate the rotation of the impeller is effected by the moving of a handle from a first or rest position to a second or intermediate position. The opening of the nozzle is effected by the moving of the handle from the second or intermediate position to a third or open position while the rotation of the impeller is continued. The closing of the nozzle is effected by the moving of the handle from the third or open position to the second or intermediate position while the rotation of the impeller is continued. The terminating of the rotation of the impeller is effected by the moving of the handle from the second or intermediate position to the first or rest position while the nozzle is maintained closed.

The invention may yet further be incorporated into a method of making a drink comprising about 7.0 to 8.0 parts of a neutral based fluid in ice-slush form, about 1.0 to 1.5 parts of a flavoring component, and about 0.9 to 1.1 parts of an alcoholic liquid. The method includes the step of providing an ice-slush machine formed with a reservoir for the receipt of the neutral based fluid, a chilling chamber in communication with the reservoir for converting the neutral based fluid into ice-slush, and a nozzle for selectively dispensing the ice-slush from the chilling chamber. The method also includes the step of positioning a container with about 1.0 to 1.5 parts of flavoring component and 0.9 to 1.1 parts alcoholic liquid therein beneath the nozzle for the receipt of ice-slush dispensed from the machine, the container having an open top end for the receipt of dispensed ice-slush and flavoring component to be blended therewith. The method also includes the steps of initiating the rotation of the impeller within the container, and thereafter dispensing about 7.0 to 8.0 parts of ice-slush into the container, and thereafter terminating the rotation of the impeller. The ice-slush within the chilling chambers is maintained at between about 22.8 and 25.2 degrees Fahrenheit. The neutral base fluid includes water and between about 11 and 13 percent by volume of sugar and between about 2 and 4 percent egg white.

The foregoing has outlined rather broadly the more pertinent and important features of the present invention in order that the detailed description of the invention that follows may be better understood whereby the present contribution to the art can be more fully appreciated. Additional features of the invention will be described hereinafter which form the subject of the claims of the present invention. It should be appreciated by those skilled in the art that the conception and the specific embodiments disclosed herein may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the nature, objects and advantages of the present invention, reference should be had to the following detailed description taken in conjunction with the accompanying drawings in which:

FIGS. 5A, 5B and 5C are enlarged sectional views of the nozzle, blender and screw pump motor as shown in FIG. 5.

FIG. 6 is an electricl schematic of the control assembly for the drink mixing system as shown in the prior Figures.

FIGS. 7 through 10 are schematic illustrations of the drink mixing system to show its method of use in making a drink.

Similar reference numerals refer to similar parts throughout the several Figures.

DETAILED DESCRIPTION OF THE INVENTION

Figure 1:
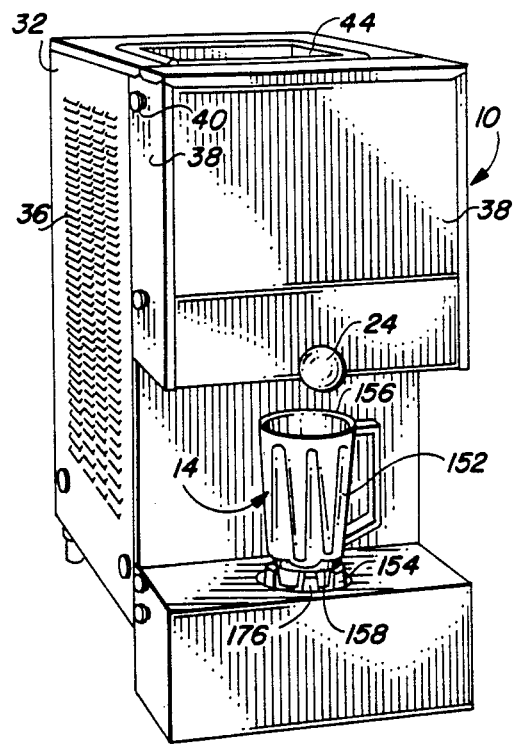
FIG. 1 is a perspective showing of a drink mixing system constructed in accordance with the principles of the present invention and which is also adapted for carrying out the method of the present invention.
Figure 2:
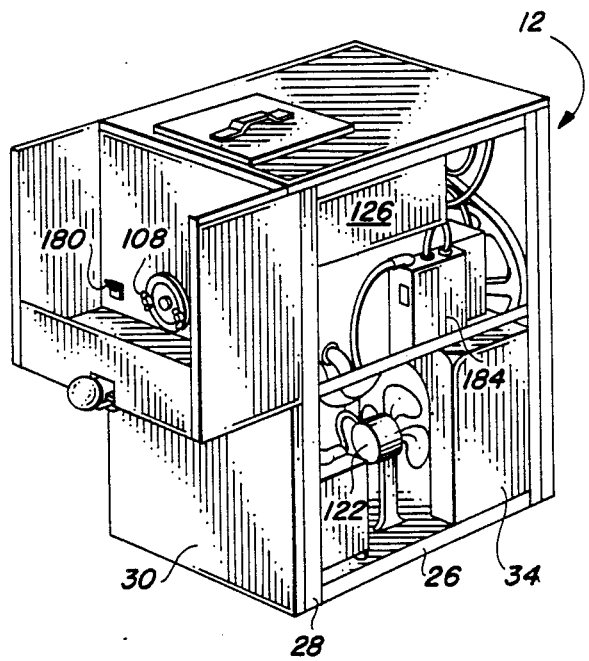
FIG. 2 is a perspective showing of the drink mixing system as illustrated in FIG. 1 but with portions of the covers removed and other parts broken away in order to show certain internal constructions.
Figure 3:
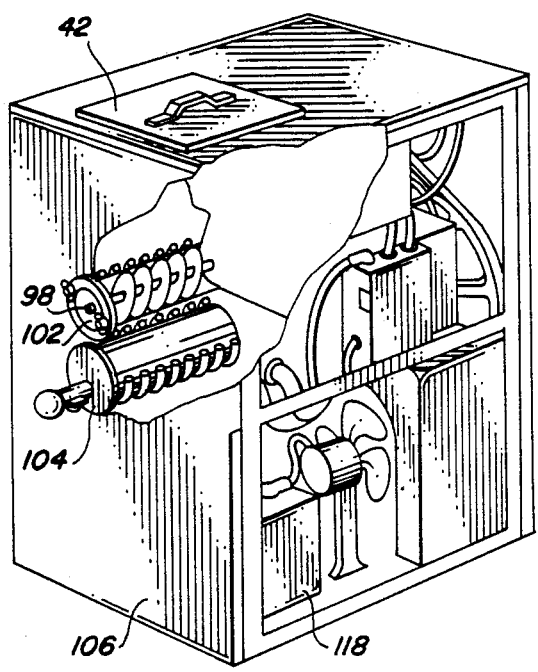
FIG. 3 is a perspective showing of the drink mixing system as shown in FIG. 2 but with additional parts broken away to show yet further internal constructions.

An overview of the drink mixing system or apparatus 10 can be seen by referring to the various Figures. The drink mixing system may be considered as including three major components. The first major component is the ice-slush machine 12, the second is the blender 14, and the third is the control assembly 16 to coordinate the proper functioning of the ice-slush machine and blender. The ice-slush machine is adapted to receive therein a quantity of neutral base liquid 18 which is converted within the ice-slush machine into ice-slush 20, the principal constituent of the drink to be made. The ice-slush may then be dispensed from the machine into a blender which has been previously provided with additional constituents such as liquor and an additional flavoring or flavorings including daiquiri mix. The blender is adapted to receive the various constituents of the intended drink and to mix or blend them to create a final drink product of uniform consistency from top to bottom and from one drink to another. The control assembly 16 is adapted to maintain the ice-slush within the machine at a proper temperature and viscosity so that all drinks are of consistent optimum flavor, alcoholic potency, and general consistency throughout the use of the system, independent of the skill of an operator. The control assembly also functions to coordinate the operation of the dispensing of the ice-slush and the activation and inactivation of the blender to mix the components in an appropriate timed sequence for creating an optimum drink.

When the drink to be made is a frozen daiquiri, for example, an appropriate quantity of liquor such as rum and fruit flavoring, whether lime, stawberry, banana or the like, are placed in the blender. The blender is placed in an appropriate position beneath the dispensing nozzle of the ice-slush machine. The operator then pulls the handle 24 to initiate the mixing of the contents of the blender followed by the dispensing of an appropriate quantity of ice-slush. The operator then returns the handle to its initial rest position to terminate the dispensing of the ice-slush followed by the termination of the rotation of the impeller and the mixing of the constituents of the drink, i.e., the ice-slush, liquor and additional flavoring material or materials. The mixed drink is then ready to be poured into a glass for serving.

The ice-slush machine is fabricated with horizontal support members 26 and vertical beams 28 to provide rigidity to the system and to permit the proper orientations of the elements one with respect to the other. Appropriate front 30, side 32, and back paneling 34 is provided to preclude inadvertent contact by a user of the system. Louvers 36 are located within the paneling to allow for the flow of cooling air to the system and from the system. An additional decorative front panel 38 is provided with thumb bolts 40 to allow easy removal of the panel for inspection and cleaning of various components of the machine.

Located at an upper extent of the machine is a container or reservoir for the receipt of a neutral base liquid adapted to be cooled or chilled and converted into the ice-slush. The liquor or neutral base is preferably formed of water and about 12 percent sugar by volume. From between about 11 and 13 percent of sugar has been found to be suitable. Additionally, about 3 percent by volume of egg white is also added to the sugar-water providing fluffiness to the neutral base when frozen to form ice-slush. From between about 2 to 4 percent of egg white has been found to be suitable. Minor or trace amounts of preservative materials may also be utilized. The freezing point of the sugar-water with egg whites is about 24 degrees Fahrenheit, about 8 degrees less than the freezing point of water without additives, about 32 degrees Fahrenheit. In the frozen state, the ice-slush will test at about a 23 percent sugar content rather than at about 12 percent as it did before freezing. When at the 24 degree temperature and ready for being dispensed, the ice-slush assumes a reduced density and expanded consistency with the screw pump whipping and conveying the fluid mixture whereby the fluid forms microspheres of encapsulated air. The new state of the neutral base precludes it from freezing up in the chilling chamber and thus allows it to flow in a preferred manner whereby it will stack itself in the container upon being dispensed.

The reservoir has vertical walls on its sides, front and back, and a lid 42 which may be removed for the adding of additional liquid neutral base. The lower face of the reservoir may be slightly tapered toward an aperture 46 so that gravity may be employed for feeding the liquid to a pair of chilling chambers 50 and 52 located therebelow.

The chilling chambers are cylindrical in shape with their axes horizontal, being vertically spaced one above the other. They are provided with vertical apertures, one on a top face of the upper chamber 54 for the flow of the liquid from above through a tube 56. A second tube 58 connects an aperture 60 in the lower face of the upper chamber with an aperture 62 in the upper face of the lower chamber to permit a complete flow communication of the ice-slush material from the reservoir to the upper chamber to the lower chamber and out of the machine.

Each chilling chamber is adapted to hold about 3 quarts, or together 192 liquid ounces, of ice-slush. When ice-slush is dispensed to make a normal size drink, between 7 and 8 fluid ounces of ice-slush is removed from the lower region of the lower chilling chamber and 7 to 8 fluid ounces of liquid neutral base replaces it in the upper region of the upper chilling chamber. The flow communication betwen the two chilling chambers and the reservoir will keep the chilling chambers full. In time, the heat exchanger 66 will convert the neutral base newly added to the chilling chamber into ice-slush. Since only about 7.0 and 8.6 percent of ice-slush is usually dispensed with the periodic dispensing, it has been found that the machine will dispense only ice-slush and not liquid neutral base during normal use. If the capacity of the chilling chamber were reduced as through the use of only a single chilling chamber, then added time or a larger capacity heat exchanger would be needed to preclude the dispensing of liquid neutral base during heavy use of the machine.

A transport means in the nature of a screw pump 68 and 70 is located axially within each cylindrical chilling chamber. Each screw pump is formed of a shaft 72 and 74 and impeller blades 76 and 78. The inboard end 80 and 82 of each shaft extends through a bearing aperture 84 and 86 at the inboard face 88 and 90 of each chilling chamber. A pulley 94 and 96 is secured on the inboard edge of each shaft to impart rotary motion to the screw pumps tending to whip and to transport ice-slush to the outboard edge of the chilling chambers. The outboard ends 98 and 100 of each screw pump shaft are mounted in a bearing surface of a plate 102 and 104 on the outboard face 106 of the machine. Wing nuts 108 and 110 secure these plates in appropriate position but they may be readily removed for cleaning the screw pumps and chilling chambers.

As used in this application, the term "inboard" is intended to mean that end, or toward that end, of the machine and operator, away from the viewer as seen in FIG. 1. The term "outboard" is intended to mean that end, or toward that end, of the machine and operator, closer to the viewer as seen in FIG. 1.

Located immediately around both chilling chambers is a tube 114 coiled around both chilling chambers. The ends of the tube are coupled with a compressor 116 having a motor 118 for allowing the flow of Freon to effect the cooling of the ice-slush within the chilling chambers. The tubes also proceed on a path adjacent the inboard face of the machine and are positioned in a serpentine path 120 to receive the flow of ambient air from a cooling motor 122 and fan 124. In this manner they may dissipate heat generated within the Freon during the cooling process. The tubes, in association with the compressor and motors, thus constitute a heat exchanger for removing heat energy from the ice-slush and dissipating such heat mechanically to the atmosphere. The entirety of the chilling chambers, reservoir, and heat exchanger coils surrounding the chilling chambers are surrounded by a thermal insulation material 126, such as expanded foam, to minimize heat lost from the ice-slush once it has been cooled.

Another significant operating element of the ice-slush machine is the nozzle 130. The nozzle has its axis slightly below the axis of the lower screw pump whereby ice-slush is constantly being urged into the nozzle by the lower screw pump. The nozzle includes a cylindrical section or cylinder 132 having an aperture on its inboard face for the receipt of ice-slush from the lower chilling chamber. The lower face of the tube is provided with a dispensing aperture 134 through which the ice-slush may be dispensed to a blender therebelow. The dispensing is normally precluded by a cylindrical stopper 136 within the nozzle inboard of the dispensing aperture. A rod 138, axially aligned with the nozzle couples the stopper with an operator-controlled handle, preferably shaped as a ball 24. A central section of the rod slides within an aperture in a washer 142 at the outboard end of the cylinder. As a result, with the handle in its first or rest position, in an extreme inboard orientation, as shown in FIG. 7, the dispensing of ice-slush will be precluded. As the handle is pulled outboardly away from the machine, the stopper will allow the outboard movement of ice-slush and its dispensing into a blender. Note the showing of FIG. 9. Pushing the handle in will close off the dispensing aperture from the ice-slush and terminate the dispensing. Note the showings of FIGS. 7 and 10. A fixed keeper 140 spans recesses in a fixed washer 142 and cylinder 132 to hold these elements fixed with respect to each other. A coil spring 144 urges the stopper 136 way from the fixed washer tending to keep the aperture 134 from dispensing and to yield to the expansion of the freezing ice slush.

Positioned in association with the handle is a blender impeller switch 148. When the handle is at its rest or fully inboard position, the switch is opened by virtue of the handle urging the impeller switch arm radially away from the axis of the rod. As the handle is withdrawn against the action of a coil spring 144, it will cease to apply an opening pressure to the switch and cause it to close prior to the initiation of the dispensing of ice-slush to thereby initiate the activation of the blender impeller. As can be understood this sequence would allow the blender to be operated independent of the dispensing of ice-slush. In normal operation, however, the handle would be pulled outwardly in a smooth flow to first activate the blender followed by the dispensing of ice-slush to the blender. Pushing of the handle back inboardly toward its initial or rest position would thus terminate the dispensing of ice-slush followed by the handle contacting the switch to open the circuit to terminate the operation of the blender.

In order to make more optimum drinks than possible with prior art devices, the present invention is designed to maintain the ice-slush at 24 degrees Fahrenheit rather than at 27 as was the case formerly. This is desirable since the ice-slush is to be mixed with alcohol, a liquid with a lower melting point than the ice-slush, which would tend to melt the ice slush. The colder initial temperature delays this melting and keeps the drink flavorful and potent longer. The reduced temperature also tends to retain the final drink colder and more frozen over a longer time period when at normal room conditions. But in maintaining ice-slush at a reduced temperature, it has been found that an enlarged dispensing aperture in the nozzle is desirable since the colder ice-slush expands requiring a larger dispensing aperture if the ice-slush is to be dispensed to the blender quickly. A 1 inch diameter dispensing aperture 134 has been found to be optimum. Dispensing apertures from about 0.9 to about 1.1 inches in diameter have also been found to function adequately.

The reservoir, chilling chambers, connecting tubes, and nozzle, or at least those portions thereof adapted to contact the consumable ice-slush are preferably made of stainless steel or other material which will not contaminate the ice-slush which is to be the major ingredient of the drink to be consumed. The thermal insulating material is preferably expanded foam or other material to minimize the heat flow from the chilling chamber tending to increase operating efficiency and thus render the machine efficient to operate.

The blender 14 is formed of two major components, the container 152 and the motion imparting mechanisms 154. The container is formed of side walls preferably constructed of a durable, transparent material. The walls are preferably upwardly tapered and terminate in an open end 156 through which the ice-slush and other constituents of the drink may be dispensed or added. The lower portion of the container is formed of a plate 158 secured to, or integrally formed with, the lower edges of the upstanding wall. Centrally located through the lower plate is a shaft 160 mounted in journals for rotation so as to preclude the flow of fluids therefrom. The upper edge of the shaft is provided with an impeller 162 having blades tilted at appropriate angles known in the art to mix the contents of the container and to create a flow of such contents being mixed from the top of the container to the bottom in a continuous flow cycle. The lower portion of the shaft is provided with a circular base plate 164 having teeth 166 facing downwardly for nesting or mating engagement with upwardly facing teeth 168 on the upper surface of a plate 170 to the rotary shaft 172 of the blender motor 174. The motor, when activated, will rotate its shaft and its ratchet plate. When the blender is properly nested upon its cooperating elements of the motor shaft plate, the blender shaft and impellers will be rotated to mix a drink. Upstanding fingers 176 secured with respect to the motor assist in locating the blender container in proper orientation with respect to the nozzle and the blender motor. The axis of the motor shaft and blender shaft extend vertically and are aligned with the axis of the dispensing aperture in the nozzle. The closing of the above-described impeller switch 148 adjacent the handle will apply power to the blender as will be described more fully later in the description of the control assembly.

The control assembly can be seen in the various Figures with particular emphasis on the electrical schematic of FIG. 6. When the normally open Power-On switch 180 is switched, electrical power is supplied by leads from a source of power such as a wall outlet. Power is thus supplied to the first power box 182 and the second power control box 184 including the various functioning components of the assembly. The blender motor is coupled by leads to the first power control box for operation in accordance with the impeller switch as elsewhere described herein. The power to the second control box will activate the screw pump motor 186 with its drive pulley 188 coupled through a V-belt 190 which drives pulley 192 to move V-belt 194 and to power screw pulleys 94 and 96 to continuously drive the screw pumps whenever the machine is activated. An additional pulley 196 is secured on an adjustable bar 198 to increase or decrease the tension on the V-belt for optimum operation.

The other driven motors are the compressor motor 118 and its associated fan motor 122 which are activated and inactivated concurrently in accordance with a viscosity control assembly and a temperature control assembly.

The term "viscosity" is intended to mean that property of a fluid that resists internal flow. Some liquids, as for example molasses, tend to resist flow and will, therefore, flow relatively slowly. As such, molasses is considered to be of a relatively high degree of viscosity. Water or neutral base as is chilled in the ice-slush machine of the present invention is of a relatively low degree of viscosity when not frozen. It will flow relatively easily. When cooled in the chilling chamber, the ice-slush will begin to freeze and thus become of an increased viscosity. Excess cooling would freeze the ice-slush excessively precluding it from being whipped and transported by the screw pumps and also precluding it from being dispensed to the blender. Such a situation is, of course, unacceptable. It is thus desirable to sense the viscosity of the ice-slush continuously and to inactivate the heat exchanger when the ice-slush approaches an unacceptably high degree of viscosity to thereby allow the present invention to function properly.

Figure 4:
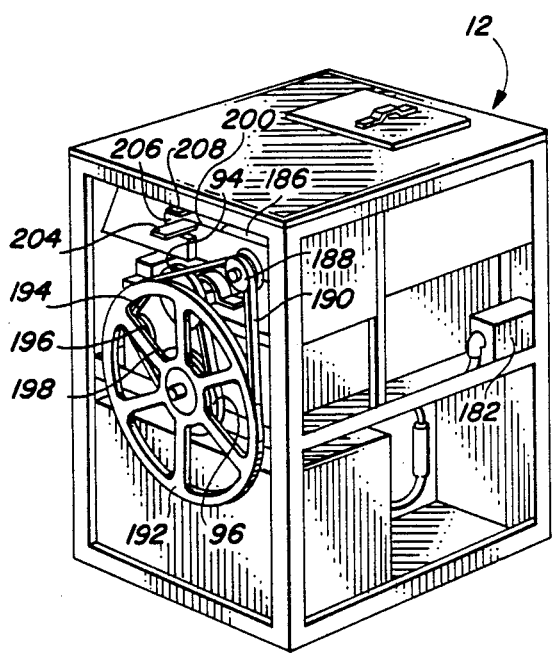
FIG. 4 is a perspective illustration of the drink mixing system similar to that shown in FIG. 2 but viewing the system from another angle to show the rearwardly positioned elements including the drive mechanisms.
Figure 5:
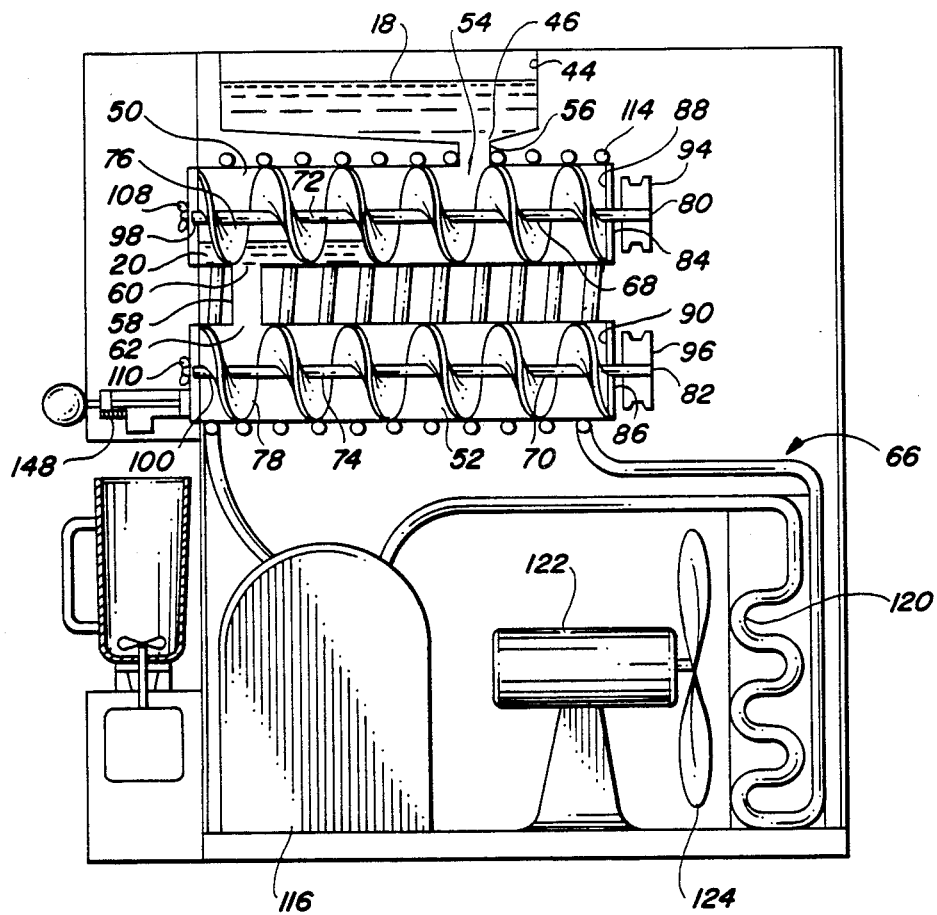
FIG. 5 is a sectional view taken vertically, from front to back, through the drink mixing system of FIGS. 1–3.
Figure 5A:
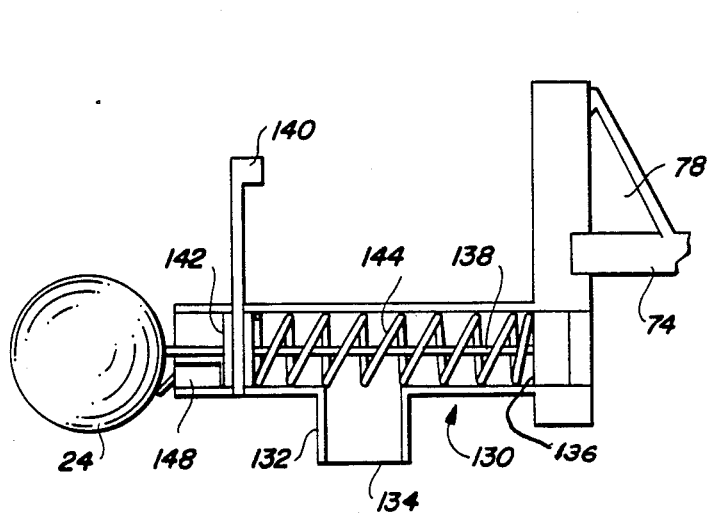
Figure 5B:
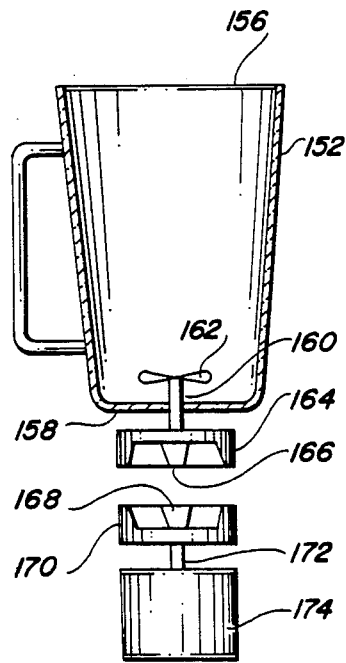

The viscosity control assembly functions through the monitoring of the power or torque required to rotate the screw pumps 68 and 70. When the machine is first turned on, the ice-slush is still in a liquid state. The motor will thus turn in a relatively free manner since it is encountering very little resistive forces from the screw pumps turning in the ice-slush. The rotation of the motor in a clockwise direction, as shown in FIG. 4, will be at its intended speed for rotating the screw pumps.

The motor housing 202 is mounted axially front and back for rotation with respect to fixed frame members of the machine. The housing includes a radially extending lever 200 secured thereto for rotation therewith. The end 204 of the lever is located in a slot 206 fixed within the machine to limit the rotation of the lever, and therefore the housing, to an arc of about 5 degrees. A coil spring 212 couples the lever and machine frame to urge the lever to its extreme clockwise position within the slot. With minimal internal forces between the rotor and stator, the force of the spring on the lever will cause the spring to urge the lever to the extreme clockwise position as seen in FIG. 4. When, however, the screw pumps and motor encounter high torque as through being turned in colder, higher viscosity ice-slush, the forces between the stator and rotor will tend to rotate the stator, housing and lever opposite from the direction of rotation of the rotor against the action of the spring. As such, the lever will overcome the force of the spring to move to the opposite end of the slot to contact the viscosity or compressor motor switch 208. This action will open the switch 208 to send a signal to the second control panel to inactivate the compressor motor and associated fan motor to stop the cooling of the chilling chambers.

When the ice-slush eventually begins to increase in temperature through the introduction of heat through the insulating material and rotation of the screw pumps, the viscosity of the ice slush will be reduced and the screw pumps will then begin to rotate more freely again, relieving the restricting pressure on the motor shaft. The increased rotary motion of the motor shaft will then permit the spring to overcome the internal forces of the motor to cause the housing and lever to rotate clockwise under the bias of the spring. The movement of the lever away from the switch 208 will close the switch and reactivate the compressor motor to again start cooling the ice-slush.

The spring 212 has one end secured to the lever 204 and one end secured to a screw 210 adjustably secured with respect to the machine. In this manner the screw may be rotated to vary the tension on the spring and thereby the viscosity of the ice-slush at which the compressor motor will be activated and inactivated. This viscosity control functions in the nature of a mechanical thermostat, activating and inactivating the compressor as required, to thereby maintain the ice-slush at an optimum viscosity.

A temperature control assembly is also provided in addition to the viscosity control assembly. The temperature control assembly, like the viscosity control assembly, has its logic control 218 in the second control box and includes a timer 220 and a remote bulb temperature sensor 222 located in the lower chilling chamber. The temperature control assembly will act to energize the compressor motor to cool the ice-slush every 10 seconds when the machine is energized so long as the compressor motor 118 is not energized by virtue of the functioning of the viscosity control assembly and so long as the temperature is not at the optimum temperature, as for example, 24 degrees Fahrenheit plus or minus about 5 percent, i.e., 22.8 to 25.2 degrees Fahrenheit. The viscosity control assembly will inactivate the compressor motor 118 only when the sensed temperature in the chilling chamber is reduced to the optimum temperature and the viscosity is consequently increased to higher than the optimum degree.

In this manner the ice-slush within the machine is maintained at a predetermined temperature and viscosity regardless of the time between the dispensing of drinks, regardless of the number of drinks dispensed within a particular period of time, and independent of the ambient conditions in which the drink mixing system is utilized. The temperature and viscosity are closely related and indirectly proportional to each other within the operating parameters of the system.

The method of making a drink in accordance with the present invention would be to provide a neutral base liquid into the reservoir 44 with the aperture 134 of the dispensing nozzle 130 closed, thus permitting the ice-slush to flow and fill the upper and lower chilling chambers 50 and 52. The machine would be activated through the switching of the Power-On switch 180 to activate the rotation of the screw pumps 68 and 70 and to activate the compressor motor 118 since the optimum temperature of the fluid in the chilling chamber is not yet reduced to an optimum state and because the viscosity is not at the optimum condition. The rotation of the screw pumps and the activation of the heat exchanger 66 would continue until optimum viscosity and temperature were reached at which time the viscosity control switch 208 would be open to inactivate the compressor motor 118. Ten seconds later, and at 10 second intervals thereafter, the temperature control through bulb sensor 222 would sense the temperature within the lower chilling chamber 52 to reactivate the compressor motor if the temperature were above optimum and if the compressor motor were inactivated. The compressor motor logic controls the proper functioning of these events. The compressor motor would only be inactivated when the optimum viscosity were again reached. This cycle would continue to occur for temperature sensing and compressor motor activation and inactivation so long as the machine were activated. Similarly, the screw pumps would continue to rotate for effectively sensing the viscosity of the ice slush to activate and inactivate the compressor motor to maintain the ice-slush at a proper viscosity.

An operator would then provide a proper amount of liquor and flavoring component directly to the container 152 of the blender 14. A normal drink, as for example, a daiquiri, might be nominally about 10 fluid ounces. Such drink would contain between about 1.0 to about 1.5 fluid ounces of a daiquiri-flavoring constituent and between about 0.9 to about 1.1 liquid ounces of alcoholic liquid. The total drink might thus contain from about 8.9 to about 10.6 fluid ounces. With these constituents in the container, the container would be nested in coupling arrangement with the blender motor ratchet base plate 170 beneath the dispensing aperture 134 of the nozzle 130. The nozzle would be pulled out by pulling the ball 24 with one smooth stroke which would normally take about 1.0 seconds and moving about 2 inches. After about ¼ inch of movement in the preferred embodiment, or in about 0.2 seconds, the ball of the handle would separate from the actuator arm of the impeller switch 148 to reserve the switch from the open to the closed state thus activating the blender motor 174 to start the rotation of the impeller 162. Continued motion of the handle would, after about a further movement of ⅜ inch, or about an additional 0.3 seconds, initiate the dispensing of the ice-slush into the blender container 152 for the mixing of the appropriate constituents of the drink. This would continue until the appropriate amount of ice-slush were dispensed at which time the operator would smoothly push in the handle to sequentially close the nozzle aperture about 0.5 seconds after initiating such handle return to terminate the dispensing of ice-slush while the blender continued to mix the finally dispensed ice-slush. At about 0.3 seconds after terminating the dispensing, the continued inboard motion of the handle would reopen the switch to terminate the mixing whereafter the handle would be back in its original or rest orientation.

The method thus includes the steps of performing an operator controlled cycle of operation to first initiate the rotation of the impeller 162, to then open the nozzle 130 for initiating the dispensing of ice-slush, to then close the nozzle for terminating the dispensing of ice-slush, and to then terminate the rotation of the impeller. More specifically, the cycle of operation is initiated by the moving of a handle from a first or rest position to a second or intermediate position. This will initiate the rotation of the impeller. Compare FIGS. 7 and 8. The opening of the nozzle is effected by the moving of the handle from the second or intermediate position to a third or open position as shown if FIG. 9 while the rotation of the impeller is continued. The closing of the nozzle is effected by the moving of the handle from the third or open position to the second or intermediate position as shown in FIG. 8 while the rotation of the impeller is continued. The terminating of the rotation of the impeller is effected by the moving of the handle from the second or intermediate position to the first or rest position while the nozzle is maintained closed. Note the elements as shown in FIG. 9.

In performing the method of the present invention, a drink would be made through the dispensing and mixing of appropriate constituents, in an optimum sequence, for optimum amounts for optimum times to make an optimum drink, time after time, and requiring little or no training of an operator.

The present disclosure includes that information contained in the appended claims as well as that in the foregoing description. Although the invention has been described in its preferred form of embodiment with a certain degree of particularity, it is understood that the present disclosure of the preferred form has been made only by way of example and that numerous changes in the details of construction, fabrication and use, including the combination and arrangement of parts and steps, may be resorted to without departing from the spirit and scope of the invention.

What is claimed is:

1. Apparatus for making a drink comprising dispensed ice-slush and blended additional flavoring constituents, said apparatus including:
   (a) an ice-slush machine formed with a reservoir for the receipt of a fluid, a chilling chamber in communication with said reservoir for converting fluid into ice-slush, a nozzle for selectively dispensing ice-slush from said machine, and transport means in communication with said chilling chamber and said nozzle to transport ice-slush from said chilling chamber to said nozzle;
   (b) a container positionable beneath said nozzle for the receipt of ice-slush dispensed from said machine, said container having an open top end for the receipt of dispensed ice-slush and flavoring constituents to be blended therewith;
   (c) a rotatable impeller for mixing the contents of the container; and
   (d) a single, operator activated control means to first initiate the rotation of said impeller, to then open said nozzle for initiating the dispensing of ice-slush while said impeller is rotating, to then close said nozzle for terminating the dispensing of ice-slush while said impeller is rotating, and to then terminate the rotation of said impeller.

2. The apparatus as set forth in claim 1 wherein said control means includes a movable handle and a switch in operative proximity with said handle.

3. The apparatus as set forth in claim 1 wherein said control means includes a switch and a handle movable from a first position, at which said switch is held in an open state to maintain said impeller inactive, to another position, at which said switch is held in a closed state to maintain said impeller operative.

4. The apparatus as set forth in claim 1 wherein said control means includes a switch and a handle movable from a first or rest position to contact with said switch which is in an open state and at which time said nozzle is closed, to a second or intermediate position out of contact with said switch which is in a closed state and at which time said nozzle is closed, to a third or opened position out of contact with said switch which is in a closed state and at which time said nozzle is opened, to the second or intermediate position out of contact with said switch which is in a closed state and at which time said nozzle is closed, and to the first or rest position in contact with said switch which is in an open state and at which time said nozzle is closed.

5. Apparatus for making a drink comprising dispensed ice-slush and at least one additional constituent, said apparatus including:
   (a) an ice-slush machine formed with a reservoir for the receipt of a fluid, a chilling chamber in communication with said reservoir for converting fluid into ice-slush, a heat exchanger coil and associated compressor adjacent said chilling chamber, a nozzle for selectively dispensing ice-slush from said machine, and transport means in communication with said chilling chamber and said nozzle to transport ice-slush from said chilling chamber to said nozzle;
   (b) a container positionable beneath said nozzle for the receipt of ice-slush dispensed from said machine, said container having an open top end for the receipt of dispensed ice-slush and at least one additional constituent to be blended therewith, said container having associated therewith a rotatable impeller for blending the contents of the container;
   (c) control means to initiate and terminate the rotation of said impeller and to open and close said nozzle for initiating and terminating the dispensing of ice-slush, all in a predetermined cycle of operation; and
   (d) control means to sense the temperature of the ice slush within said chilling chamber at predetermined time intervals and to activate said compressor whenever said compressor in inactive and the temperature within said chilling chamber is increased to above a predetermined optimum value, the control means also adapted to sense the viscosity of the ice-slush within the chilling chamber and to inactivate said compressor whenever the viscosity of the ice slush within the chilling chamber is increased to higher than the predetermined optimum value.

6. Apparatus for making a drink comprising blended flavoring and dispensed ice-slush, said appartus including:
   (a) an ice-slush machine formed with a reservoir; neutral base formed of water, sugar and egg white; two cylindrical chilling chambers with vertically spaced parallel axes in communication with said reservoir; a heat exchanger in association with said chilling chambers for converting said neutral base within said chilling chambers into ice-slush; a nozzle for selectively dispensing ice-slush from said machine; and two screw pumps rotatable about vertically spaced, parallel axes within said chilling chambers to whip and transport ice-slush from said chilling chambers to said nozzle;
   (b) a container positionable beneath said nozzle for the receipt of ice-slush dispensed from said machine, said container having an open top end for the receipt of dispensed ice-slush and flavoring to be blended therewith, said container having mounted in operative association therewith a rotatable impeller for blending the contents of the container; and
   (c) control means to initiate and terminate the rotation of said impeller and to open and close said nozzle for intiating and terminating the dispensing of ice-slush, all in a predetermined cycle of operation.

7. The apparatus as set forth in claim 6 and further including means to maintain the ice slush within said chilling chambers at a predetermined temperature and viscosity.

8. The apparatus as set forth in claim 6 wherein said chilling chamber includes a heat exchanger coil encompassing both said screw pumps and a compressor operatively coupled with said coil.

9. The apparatus as set forth in claim 6 wherein said chilling chamber is maintained at between about 22.8 and 25.2 degrees Fahrenheit and said nozzle dispenses the ice-slush through an aperture of between about 0.9 and 1.1 inches in diameter.

10. The apparatus as set forth in claim 6 wherein the neutral base includes between about 11 and 13 percent sugar by volume and about 2 and 4 percent egg white by volume and said nozzle dispenses the ice-slush through an aperture of between about 0.9 and 1.1 inches in diameter.

11. The apparatus as set forth in claim 6 wherein the normal drink requires about 7 to 8 fluid ounces of ice-slush and said chilling chambers each contain about 3 quarts of ice-slush.

12. A method of making a drink comprising dispensed ice-slush and blended flavoring, said method including the steps of:
   (a) providing an ice-slush machine formed with a reservoir for the receipt of a fluid, a chilling chamber in communication with said reservoir for converting fluid into ice-slush, a nozzle for selectively dispensing ice-slush from said machine, and a transport means in communication with said chilling chamber and said nozzle to transport ice-slush from said chilling chamber to said nozzle;
   (b) positioning a container beneath said nozzle for the receipt of ice-slush dispensed from said machine, said container having an open top end for the receipt of dispensed ice-slush and flavoring to be blended therewith, said container having mounted in association therewith a rotatable impeller for blending the contents of the container; and
   (c) performing an operator controlled cycle of operation to first initiate the rotation of said impeller, to then open said nozzle for initiating the dispensing of ice-slush, to then close said nozzle for terminating the dispensing of ice-slush, and to then terminate the rotation of said impeller.

13. The method as set forth in claim 12 wherein said performing an operator controlled cycle of operation to initiate the rotation of said impeller is effected by the moving of a handle from a first or rest position to a second or intermediate position.

14. The method as set forth in claim 13 wherein the opening of said nozzle is effected by the moving of the handle from the second or intermediate position to a third or open position while the rotation of said impeller is continued.

15. The method as set forth in claim 14 wherein the closing of said nozzle is effected by the moving of the handle from the third or open position to the second or intermediate position while the rotation of said impeller is continued.

16. The method as set forth in claim 15 wherein the terminating of the rotation of said impeller is effected by the moving of the handle from the second or intermediate position to the first or rest position while said nozzle is maintained closed.

* * * * *